United States Patent [19]
Roberts

[11] 3,897,236
[45] July 29, 1975

[54] PROCESS FOR FORMING FERROUS IRON-CONTAINING PHOSPHORUS GLASSES

[75] Inventor: Gordon J. Roberts, Shaker Heights, Ohio

[73] Assignee: Ferro Corporation, Cleveland, Ohio

[22] Filed: Feb. 15, 1973

[21] Appl. No.: 332,631

[52] U.S. Cl. .............................. 71/1; 71/39; 71/32; 71/41; 71/63; 106/47 R; 423/305
[51] Int. Cl. .............................................. C05d 9/02
[58] Field of Search ............ 71/1, 39, 41, 64 A, 63; 106/47 R; 423/305

[56] References Cited
UNITED STATES PATENTS

| | | | |
|---|---|---|---|
| 3,151,936 | 10/1964 | Hollingsworth et al. | 71/41 X |
| 3,407,035 | 10/1968 | Shen | 423/305 |
| 3,650,732 | 3/1972 | Scott et al. | 423/305 X |
| 3,762,909 | 10/1973 | Davie et al. | 71/1 |

*Primary Examiner*—Robert L. Lindsay, Jr.
*Attorney, Agent, or Firm*—Milton L. Simmons; Wesley B. Taylor

[57] ABSTRACT

An inexpensive, relatively quick process is disclosed for preparing iron-containing phosphorus glasses. These glasses are substantially free of silica, alumina, boron, and alkaline earth components normally found in many glasses and serve as nutrients in comminuted form to provide a source of ferrous iron, for example, to plants and seeds. The glasses release ferrous iron over a prolonged period of time and are effective in either acidic or alkaline soils.

16 Claims, No Drawings

PROCESS FOR FORMING FERROUS IRON-CONTAINING PHOSPHORUS GLASSES

CROSS-REFERENCE TO RELATED APPLICATION

The ferrous iron-containing glasses of this application are disclosed and claimed in an application entitled, "Micronutrient Iron-Containing Phosphorous Glasses," filed Nov. 6, 1972 in the names of Gordon J. Roberts and Shelton E. Allred, and assigned Ser. No. 303,830.

BACKGROUND OF THE INVENTION

The importance of minor amounts of certain elements in nutrition, such as plant nutrition, is well established. It has been demonstrated that minor amounts of such elements as iron, manganese, copper, boron, zinc, cobalt and molybdenum are all important and essential to the proper physiological functioning of plants. Even where a soil contains sufficient amounts of iron and other nutrient elements, deficiencies of these elements still occur in plants growing in that soil due to chemical and physiological processes which render such elements unavailable to the plants or make them inactive in the physiological functions within the plant.

Actual iron deficiency is fairly widespread in soil. Further, soil conditions can affect assimilation by a plant of iron and other nutrient elements that may be present even in adequate amounts. In particular, an alkaline soil, that is, one having an alkaline pH, is generally regarded as being more difficult from which to supply iron for plant life, than from an acidic soil. For example, iron deficiency causes chlorosis in plants in which normally green leaves turn white. Lime, which is often added to soils to reduce acidity, can induce chlorosis in plants. this is thought to be due to a high calcium carbonate content of the soil which raises the pH value of the soil to such an extent that iron is precipitated and made unavailable to plants. Still other causes become important under certain conditions. It has been demonstrated in solution cultures at a neutral or alkaline reaction that an interrelation between phosphorous, as from fertilizer, and iron exists which results in iron deficiency.

To combat such soil deficiencies, one successful technique resides in preparing fritted glasses containing nutrient elements which are added directly to the soil. Under wet or damp growing conditions, small amounts of the nutrient element are made available in the immediate vicinity of seeds and plant roots. It is not a simple matter to fabricate a glass for this purpose. For example, the solubility of the glass in water should be relatively small in order to prevent a quick release of nutrient elements and also to prevent them from being rendered unavailable to the plants through chemical reaction in the soil. Yet, the solubility cannot be so small that the rate of release of the nutrients from the glass is inadequate for plant growth. Further, the glass must be non-toxic in high concentrations to plants or seeds, so that large amounts of the glass can be applied at one time to furnish an ample supply of the nutrient in the soil over an extended period of time.

In the cited Roberts and Allred application, Ser. No. 303,830, ferrous iron-containing phosphorous glasses are disclosed which are adapted to provide iron as a nutrient element, especially for plants grown in various soils including soils having an alkaline pH. When these glasses are prepared in a more conventional manner, as for example by smelting a mixture containing the requisite amounts of ferric oxide, monoammonium phosphate, potassium carbonate, and a reducing agent, the process is relatively expensive and there are emission problems because of ammonia and other byproducts that are formed. The present invention relates to process improvements in preparing glasses of the ferrous-phosphorous type and relates especially to reducing the cost and time requirements of preparing such glasses.

SUMMARY OF THE INVENTION

The principal object of the present invention is to provide a process for preparing ferrous iron-containing phosphorous glasses and preferably glasses of the FeO-$R_2O$-$P_2O_5$ system in which R is potassium or sodium. Glasses of this system have been found to have excellent iron release characteristics in both acid and alkaline soils. The initial formative, chemically-reactive steps of the present process can be carried out quickly and at room temperatures without the application of heat to form a solid intermediate. The intermediate can be readily smelted under reducing conditions to a liquid which can then be quenched to form a ferrous iron-containing phorphorous glass.

In the present process, a reactive iron compound, such as magnetite, is reacted with a mixture of phosphoric acid and a halogenic acid, preferably hydrochloric acid, to form the solid intermediate. This is an exothermic reaction which can be initiated by merely mixing the reactants at room temperatures (approximately 65°F to 85°F) and can be completed in a short time, for example, less than 10 minutes and in some instances less than 5 minutes. The solid intermediate is then easily smelted in the presence of a reducing agent to provide the desired ferrous-containing phosphorous glasses.

The mixture of phosphoric and halogenic acids has been found to have a totally unexpected effect in greatly accelerating the reaction and obtaining the desired results. Reaction of the present mixture of acids is not unlike that of aqua regia is that neither phosphoric acid nor a halogenic acid performs nearly as well when used alone in a reaction of the type described.

The use of certain reactants and the amount of such reactants can be preselected to control the composition of the ultimate ferrous-phosphorous glass. In this aspect of the invention, phosphoric acid is used in an amount greater than that of the halogenic acid. The halogenic acid may also be formed from a metal halide, the metal of the halide being one of the desired components of the final glass composition. Similarly, the reducing agent can contain phosphorus as a partial source of that element, in addition to the phosphoric acid, for the ultimate glass composition.

When a ferrous-phosphorous glass obtained from the present process is to be used as a nutrient for soils, the glass preferably comprises in weight percent about 50 to about 75 percent phosphorus pentoxide, about 20 to about 45 percent ferrous oxide, and about 0 to about 10 percent $R_2O$ in which R is potassium or sodium, provided that not more than 50 percent of $R_2O$ is $Na_2O$.

DESCRIPTION OF THE PREFERRED EMBODIMENTS

In prior glasses having nutrient elements, the oxidation state of the element has not been controlled. The valency state of a nutrient element of variable valency has been found to be important. For example, $Fe^{2+}$ and $Mn^{2+}$ are both much more easily assimilated by plants than the more common forms $Fe^{3+}$ and $Mn^{3+}$. Silicate and borate glasses are basically oxidizing systems. Accordingly, if an element of variable valency is dissolved in such a glass, at least the majority if not all of it is present in the higher valence form. Silicate and borate glasses are, therefore, handicapped in releasing the preferred ferrous form of iron, since these glasses must somehow undergo a rather vigorous chemical reduction to provide an element of variable valence in the lower valence state. For a similar reason, glasses rich in alkali are not well suited as nutrient glasses in accordance with the present invention, because the presence of substantial amounts of alkali millitate against the ease of chemically reducing elements of variable valence such as iron.

Glasses produced by the present process contain iron in a state of low valence and are operable not only in acidic soils but in the more difficult to enrich alkaline soils. By avoiding a silicate or borate base glass and using instead a considerably less oxidizing phosphate glass base, an iron component can be incorporated directly into a glass as a constituent of it and in a ferrous form.

The present process comprises, in general, reacting a reactive iron compound with a mixture of phosphoric and halogenic acids to form a solidified intermediate, and then smelting the intermediate in the presence of a reducing agent to produce a ferrous-phosphorous glass.

Considering initially the reactants involved, there are many iron compounds reactive with the hereinafter described mixture of phosphoric and halogenic acids and capable of producing a ferrous-phosphate glass. In general, iron oxides are desired in which iron may have any of its usual valences. The preferred iron oxide is a natural ore, magnetite, $Fe_3O_4$, in view of its ready availability and since it is already partially reduced. In addition to iron oxides, iron salts of both inorganic and organic acids are useful, although not as desirable as the oxides, since obnoxious effluent gases may be released as in the cases of iron sulfide, iron carbonate, iron sulfate, and the like. Preferably, when an iron acid salt is used, the parent acid should be weaker or more volatile then phosphoric acid in order to ensure continuation of the chemical reaction. As used herein, the strength of an acid is measured by its ease of ionization in water, the greater the ease the stronger the acid. Examples of useful reactive iron compounds include: iron oxide, hydrated iron oxide (iron hydroxide), iron carbonate, iron sulfate, iron sulfite, iron sulfide, iron nitrate, iron acetate, iron citrate, iron fumarate, and iron benzoate.

The halogenic acid that is mixed with phosphoric acid may include any of the usual four halogens, that is: HCl, HBr, HI, HF. However, if the ferrous-phosphorous glass is to be used as a nutrient for soils, HF is not recommended since flourine is believed to be deleterious to plant growth. The preferred halogenic acid is hydrochloric acid. Since a ferrous-phosphorous glass is sought in which $P_2O_5$ predominates, as hereinafter more fully described, phosphoric acid is usually present in an amount greater than the amount of the halogenic acid.

While it is a mixture of phosphoric and halogenic acids that has been found to have such a pernicious attack on the other components of the reaction, it is understood that the acid mixture can be formed in situ. Accordingly, neither acid component need initially be present in the reaction mixture in the acid form per se, although at least one acid component should be present in such form. Thus, a phosphate salt may be used which is converted to phosphoric acid in the course of the reaction. The cation of the phosphate salt may be any moiety that does not interfere with the reaction and which, if it is not lost as effluent, is not undesirable in the final glass composition. For example, ammonium phosphate may be used although this normally results in ammonia as part of the effluent. Metallic cations are preferred such as iron or optionally potassium and/or sodium, since oxides of the last two metals form a preferred basic ternary glass system with FeO and $P_2O_5$ as hereinafter described. Substituted acid phosphates, such as $KH_2PO_4$ and $K_2HPO_4$ may be used as well.

Similarly, although a halogenic acid like hydrochloric acid may be used as a starting reactant, it is preferred to use a halide salt because of cost and convenience in handling this reactant. The same considerations prevail as for the phosphate salt, that is, the cation of the halide salt may be any moiety that does not interfere with the reaction and which, if it is not lost as effluent, is not undesirable in the final glass compositions. The cation for the halide may be organic, such as methylamine hydrochloride, aniline hydrochloride, etc.; or inorganic such as ammonium halide, metal halide, and the like. Metal halides are preferred such as calcium, manganese, and zinc halides and of the metal halides iron, potassium, and sodium halides are best since these metals, themselves, are desirable additions to the glass systems.

More particularly, while the ferrous-phosphorous glass produced by the present process is basically a binary system of the oxides of these two elements, the addition of $R_2O$ in which R is potassium or sodium serves as a flux in smelting the batch ingredients and as an aid to glass formation and the desired degree of water solubility. Potassium and sodium can be added to the reaction mixture as salts of inorganic acids such as the nitrates, sulfates, carbonates, phosphates, or halides. The phosphates and halides are preferred and especially the chlorides, since these compounds contribute to the formation of the phosphoric or halogenic acid for the acid mixture of the present process. Alternatively, potassium and sodium may be directly added as oxides.

The reducing agent used may be any of those known in the art capable of reducing ferric oxide or ferric phosphates to iron having a lower valence. Solidified carbonaceous materials can be used for this purpose such as starch, sawdust, carbon, straw, etc. However, consistent with the theme to use reactants which contribute to the desired composition of the final glass, a reductant of metallic iron in finely divided form such as iron fillings, or of phosphorous such as the alloy ferrophosphorous may be used, either alone or in combination with such solid carbonaceous reducing agents. Use of metal reductants is preferred to eliminate or reduce effluent gases and odors which usually accompany the use of carbonaceous reductants.

In carrying out the present process, the reactive iron compound and phosphorous and halogenic acids or precursors thereof are mixed, preferably in the presence of a potassium or sodium salt, at room temperatures (approximately 65°F to 85°F). A vigorous reaction begins shortly, usually in about 30 seconds, which is exothermic. The reaction mixture passes from a liquid through a thickening, syrupy stage to paste, until quite suddenly it becomes a stiff, damp powdery solid. The exact nature of the resulting solid intermediate is not clearly known, but it is believed to be a mixture principally of ferric phosphate, ferrous phosphate, possibly a little excess phosphoric acid accounting for the "dampness," and when a potassium salt or equivalent was part of the reaction mixture, potassium phosphate and potassium halide. The solidified intermediate hardens on standing. The reaction subsides at this point since most, if not all, of the acids has been consumed or lost through volatilization. When a halogenic acid is present with the phosphoric acid, the reaction is completed within minutes, for example, less than 10 minutes and often less than 5 minutes. When either acid is used alone, the reaction may take several hours to complete at room temperatures.

The fact that the intermediate is a solid is of advantage in that a subsequent smelting step can be carried out whenever convenient. Indeed, the intermediate can be stored until needed or shipped to a point of use. The comminuted solid and reducing agent are then mixed and smelted to glass form within a relatively short time, because of the pre-reacted nature of the intermediate, for example, at about 900°C to about 1500°C in about 5 minutes to about 15 minutes. This produces a homogeneous, sufficiently reduced melt which may be conventionally quenched to form the ferrousphosphorous glass. When the glass is to be used as a nutrient, it is fritted. That is, the molten glass is quickly quenched causing it to shatter into relatively small solid chunks because of strains created within the vitreous mass. Fritting may be accomplished by running the molten mass into water, or by running it between steel rolls, or by still other known means.

When the glass is to be placed in soil for enriching its plant life, the frit is preferably further comminuted. As an example, the comminuted glass may have a maximum particle size of about 90 percent through a 20 U.S. Standard mesh screen to a minimum particle size of about 90 percent through a 200 U.S. Standard mesh screen. The comminuted glass should be placed in the soil as near as possible to the plant roots or seeds in view of the limited mobility of iron in soil.

Proportions are not critical to the present invention. The invention contemplates in general producing any ferrous-phosphorous glass by the previously described procedure. The FeO is of course the source of the ferrous iron. However, as a rule it is difficult to obtain more than about 45 percent by weight of FeO. If batch materials are chosen to yield more iron oxide than about 45 percent by weight, it is not readily possible to reduce all of such oxide to the desired ferrous form with the result that any excess iron is present in some other valence form. The amount of ferrous iron oxide present necessarily dictates the amount of $P_2O_5$ present in what preferably is an essentially binary system when the glass is to be used as a nutrient. The $P_2O_5$ ingredient provides the desired relatively non-oxidizing phosphate based glass and further contributes to an acid aqueous soil extraction which tends to neutralize locally the less desirable alkaline pH soil.

As previously noted, the addition of $R_2O$ in which R is potassium or sodium is preferred as a flux in smelting the batch ingredients and as an aid to glass formation and water solubility. $Na_2O$ renders the glasses less water-soluble than $K_2O$, but $Na_2O$ may be used in combination with $K_2O$ when it is desired to provide a glass having a slow release of ferrous iron. However, $Na_2O$ should not constitute more than about 50 percent by weight of $R_2O$.

The desired composition of the ultimate glass formed is controlled by the choice and amount of batch materials. When the glass is to be used as a nutrient for soils, the batch materials should be selected to provide a glass consisting essentially in weight percent of about: 50 to 75 percent and preferably 55 to 70 percent of $P_2O_5$; 20 to 45 percent and preferably 30 to 45 percent of FeO; and 0 to 10 percent of $R_2O$ in which R is potassium or sodium and in which $R_2O$ contains no more than about 50 percent of its weight as $Na_2O$, and preferably 2 to 8 percent $K_2O$. In use, glasses within these composition ranges have a desired rate of release of ferrous iron over a prolonged period of time. Aqueous leaching as by soil water produces an aqueous extract having an acidic pH. This is particularly significant in soils having an alkaline pH which militate against assimilation by plants of ferrous iron.

The following examples are intended only to illustrate the invention and should not be construed to impose limitations on the claims. Compositions are by weight percent unless otherwise indicated.

EXAMPLE 1

To test the activity of phosphoric acid alone in the environment of the present process, that is, without the conjoint use of a halogenic acid, various types of iron oxide in which iron has different valences were examined for their reactivity with strong phosphoric acid (85 percent $H_3PO_4$). None of the red iron oxides ($Fe_2O_3$) that were tried reacted with phosphoric acid even at 100°C. The normal coarse grade of magnetite ($Fe_3O_4$, in which one-third of the iron is already in the ferrous state) did not show any appreciable reaction with phosphoric acid alone. Samples of finer magnetite screened out from the rather coarse grade and having a U.S. Standard mesh size of minus 200 did show a slight reaction with phorphoric acid. This was due to the much greater surface area available for reaction, and even in this instance the magnetite would require in excess of several hours to complete a reaction leading to the solidified intermediate previously described.

EXAMPLES 2 THROUGH 4

In these examples the reactive iron compound was an iron oxide concentrate produced by froth floatation of crushed Taconite ore, a magnetite ore obtained from the vicinity of Evleth, Minnesota. The analysis of the concentrate in weight percent was; 93.7 percent of $Fe_3O_4$ and 4.44 percent of $SiO_2$, the balance being impurities. The ore concentrate was strongly magnetic and had the following screen analysis, U.S. Standard Sieve:

| Percent | Mesh Size |
|---|---|
| 1.7 | +200 |
| 3.8 | −200 to +270 |
| 6.3 | −270 to +325 |
| 13.0 | −325 to +400 |
| 15.1 | −400 to +500 |
| 60.1 | −500 |

The reductant used was ferrophosphorus, an iron-phorphorous alloy. The alloy is brittle as was ground to minus 100 U.S. Standard Sieve. Table A provides the compositions for three batches in parts by weight.

TABLE A

| Example | Parts by Weight | | |
|---|---|---|---|
| | 2 | 3 | 4 |
| Taconite concentrate | 74.8 | 74.8 | 74.8 |
| 85% H$_3$PO$_4$ | 184.0 | 184.0 | 184.0 |
| Ferrosphosphorus | 22.7 | 22.7 | 22.7 |
| K$_2$CO$_3$ | 14.8 | 13.2 | — |
| KCl | 5.3 | 7.0 | 21.3 |

All solid materials except the ferrophosphorus were mixed and rapidly introduced with stirring into the liquid phosphoric acid. The batch composition of Example 4 reacted very quickly. The mix thickened and became lighter in color. In less than one minute a dry powdery intermediate reaction product was obtained. The batch compositions of Examples 2 and 3 reacted more slowly, but in each case the reaction was complete in less than 5 minutes. A definite smell of hydrochloric acid was emitted by the reaction mixture, particularly noticeable toward the end of the reaction when the mixture became too hot to touch. Hydrochloric acid was produced by reaction between phosphoric acid and potassium chloride. The powdery intermediate reaction product from each example was next mixed with ferrophosphorus and smelted at 1200°C for about 15 to 20 minutes. Each melt was then roll-quenched to provide a darkish but transparent rolled flake. The flakes were dry-ground and graded to minus 200 to plus 325 U.S. Standard Sieve.

In place of ferrophosphorus, iron filings ground to minus 100 U.S. Standard Sieve could have been used as the reductant. It is preferred to add the reductant after formation of the intermediate product. If iron powder or ferrophosphorus was added with the reactive iron compound to the phosphoric acid, the reductant would react with the acid with liberation of hydrogen. This would not only deplete the amount of phosphoric acid available for reaction with the reactive iron compound but also remove the reductant.

EXAMPLE 5

In this example, the reactive iron compound was magnetite having an iron content of 65.4 percent corresponding to 90.2 percent of pure Fe$_3$O$_4$. Water was added to the phosphoric acid to convert it to 78 percent H$_3$PO$_4$ which is the nearest commercial grade of acid now available. The batch consisted in parts by weight of:

| | |
|---|---|
| Fine Magnetite | 83.6 |
| 85% H$_3$PO$_4$ | 184.0 |
| Water | 17.0 |
| Ferrophosphorus | 26.0 |
| KCl | 21.3 |

All solid reactants except the ferrophosphorus were added with continuous stirring to the diluted phosphoric acid. After about 1 minute, much heat was evolved and the reaction proceeded resulting in about 8 minutes in a stiff paste. The ferrophosphorus was then added and the resulting batch smelted at 1225°C for 20 minutes. The rolled flake formed conventionally from the melt was a transparent, light brown color, indicative of a good although not absolutely complete reduction to the ferrous iron form.

EXAMPLES 6 THROUGH 8

In these examples, ferrophosphorus and starch were jointly used as the reductant. The batches used in parts by weight are shown in Table B.

TABLE B

| Example | Parts by Weight | | |
|---|---|---|---|
| | 6 | 7 | 8 |
| Fine magnetite | 66.2 | 73.8 | 81.4 |
| KCl | 10.0 | 10.0 | 10.0 |
| 85% H$_3$PO$_4$ | 176.4 | 164.4 | 152.0 |
| Ferrophosphorus | 10.0 | 10.0 | 10.0 |
| Starch | 10.0 | 10.0 | 10.0 |

The ferrophosphorus and starch were added to the other ingredients after they had been mixed at room temperatures to initiate an exothermic raction resulting in a powdery intermediate product. In each example, the resulting mixture was smelted at 1225°C. All compositions melted well. The glasses of Examples 6 and 7 were clear and quite well reduced, but the glass of Example 8 was somewhat darker. If desired, the ferrophosphorus could be replaced by additional starch in like amount.

EXAMPLES 9 THROUGH 15

Mill scale was used as the reactive iron compound in the examples of this group. Chemical analysis indicated 71.7 percent Fe, and qualitative analysis indicated small amounts of manganese and silicon to be the main impurities. Table C provides the batch compositions in parts by weight for these examples, the lowermost line providing the amount of iron in weight percent in the smelted glass.

TABLE C

Batch Recipes for Ferrous Phosphate Frits Based on Mill-Scale

| Example | Parts by Weight | | | | | | |
|---|---|---|---|---|---|---|---|
| | 9 | 10 | 11 | 12 | 13 | 14 | 15 |
| Mill Scale | 69.6 | 69.6 | 69.6 | 69.6 | 70.0 | 70.0 | 67.6 |
| 85% H$_3$PO$_4$ | 159.5 | 222.0 | 189.0 | 159.0 | 160.0 | 150.0 | 160.0 |
| KCl | 13.0 | 11.3 | 11.3 | 13.0 | 15.0 | 15.0 | 25.0 |
| Ferrophosphorus | 7.9 | 10.0 | 10.0 | 10.0 | 10.0 | 10.0 | 10.0 |
| Powdered Quartz | — | — | — | — | — | 6.0 | — |
| Fe content in Smelted Glass (% wt) | 30 | 25 | 27.5 | 30 | 30 | 30 | 27.5 |

All of the batch materials for Example 9 except the ferrophosphorus were rapidly mixed and continuously stirred. After a period of gradual warming of about two minutes, a vigorous reaction occurred and a solidified product was quickly produced in about five minutes from the start of the mixing. The solidified product was then mixed with the ferrophosphorus and smelted at 1250°C. A fluid melt was produced in 20 minutes, and on roll-quenching it became clear that not all of the ferric iron had been reduced. Thus, while the batch composition of Example 9 results in a ferrous-phosphorous glass, the glass would not be recommended for nutritional use, since a significant amount of ferric iron remained in the glass.

A further series of melts was then made in a like manner, represented by Examples 10 through 12, using more reductant with contents of 25 percent, 27.5 percent and 30 percent Fe, respectively, in the final glasses. The speed of reaction was slower the lower the iron content, varying from about 10 minutes for the 25 percent Fe glass to about 5 minutes for the 30 percent Fe glass. All batches smelted easily (a little ferrophosphorus remained floating on the surface of the melt) and yielded well-reduced rolled flake glass.

Both of the glasses made in Examples 13 and 14 had a 30 percent Fe content in the finished glass. But 3 percent $P_2O_5$ was omitted and 3 percent $SiO_2$ was added to Example 13 to make Example 14. The reacted batches were smelted at 1250°C for 30 minutes and roll-quenched. Both resulting glasses were well reduced.

In Example 15, the KCl content was substantially increased and a target iron content of 27.5 percent was chosen for the smelted glass. The composition of Example 15 produced a well reduced glass.

EXAMPLES 16 THROUGH 28

Canadian Taconite concentrate (magnetite) was used in these examples. It had the same iron content as the Taconite concentrate of Examples 2 through 4. The reductant use for these examples was starch alone or a combination of starch and ferrophosphorus. In the combination any relative amounts of either the starch or ferrophosphorus may be used. The presence of starch tends to control and render more uniform the chemical reactivity of the ferrophosphorus. Starch also tends to complete any reduction not affected by the ferrophosphorus.

Table D provides the batch compositions in parts by weight for these examples as well as the ferrous iron content in weight percent for the resulting smelted glasses. In Examples 16 through 21, in which only starch was used as the reductant, the batch constituents without starch reacted completely in a few minutes, after which the starch was then mixed in. All compositions (Examples 16 to 21) smelted easily at 1250°C to fluid liquids. On roll-quenching, the resulting glasses of Examples 16, 17 and 18 were somewhat dark indicating incomplete reduction to ferrous iron. However, glasses of Examples 19, 20 and 21 prepared with more starch were much better reduced and contained little or no ferric iron. The glass of Example 19 was ground, graded, and extraction tested, using the ammonium acetate extraction test. A description of this test is provided in detail in the cited Roberts and Allred application, Ser. No. 303,830. With the glass of Example 19, 1.4 percent ferrous iron was extracted at pH 5.7, and 2.9 percent ferrous iron was extracted at pH 8.0.

TABLE D

Batch Recipes and Iron Contents of Ferrous Phosphate Glasses Based on Canadian Taconite Concentrate
Parts by Weight

| Example | 16 | 17 | 18 | 19 | 20 | 21 | 22 | 23 | 24 | 25 | 26 | 27 | 28 |
|---|---|---|---|---|---|---|---|---|---|---|---|---|---|
| Canadian Taconite | 74.4 | 81.8 | 89.2 | 74.4 | 81.8 | 89.2 | 59.4 | 74.0 | 64.4 | 79.2 | 64.4 | 71.6 | 79.2 |
| KCl | 10.0 | 10.0 | 10.0 | 10.0 | 10.0 | 10.0 | 10.0 | 10.0 | 10.0 | 10.0 | 10.0 | 10.0 | 10.0 |
| 85% $H_3PO_4$ | 187.4 | 175.6 | 163.6 | 187.4 | 175.6 | 163.6 | 176.0 | 152.0 | 179.4 | 155.6 | 179.4 | 168.0 | 155.6 |
| Starch | 10.0 | 10.0 | 10.0 | 20.0 | 20.0 | 20.0 | 5.0 | 5.0 | 5.0 | 5.0 | 10.0 | 10.0 | 10.0 |
| Ferrophosphorus | — | — | — | — | — | — | 15.0 | 15.0 | 10.0 | 10.0 | 10.0 | 10.0 | 10.0 |
| Fe Content of Finished Glass (wt.%) | 25 | 27.5 | 30 | 25 | 27.5 | 30 | 25 | 30 | 25 | 30 | 25 | 27.5 | 30 |

In Examples 22 and 23 of Table D, a combination of starch and ferrophosphorus was used as the reductant and added after the batch chemical reaction of the other ingredients was completed in the manner previously described. Both of the batches of Examples 22 and 23 smelted well at 1250°C, but extra time up to about 25 to 30 minutes was alotted to enable the bulk of ferrophosphorus to react and dissolve. When the melts were roll-quenched, there appear to be little undissolved ferrophosphorus. The glass of Exampled 22 was quite pale, while the glass of Example 23 was a little darker although still well reduced. Extraction tests by the ammonium acetate extraction technique give the following results: The glass of Example 22 provided a 1.75 percent ferrous iron extraction at a pH of 5.7 and 6.6 percent ferrous iron extraction at a pH of 8.0; the glass of Example 23 provided a 1.1 percent ferrous iron extraction at a pH of 5.7 and a 0.3 percent ferrous iron extraction at a pH of 8.0.

In Examples 24 and 25 of Table D, the starch level was kept the same but the amount of ferrophosphorus was reduced as compared with Examples 22 and 23. The target levels of ferrous iron content of 25 percent and 30 percent in the finished smelted glasses were again investigated. The glass preparation was exactly the same as before. The ferrophosphorus reacted and disappeared quickly uponsmelting. The rolled flakes produced from the glasses were dark for both examples and indicated that not all iron oxide was reduced to the ferrous form. The ammonium acetate extraction tests provided these results: The glass of Example 24 had a 0.7 percent ferrous iron extraction at a pH of 5.7 and a 3.5 percent ferrous iron extraction at a pH of 8.0; the glass of Example 25 had a 0.8 percent ferrous iron extraction at a pH of 5.7 and a 0.4 percent ferrous iron extraction at a pH of 8.0.

The series of Examples 26, 27 and 28 utilized the easily assimilable ten parts by weight of ferrophosphorus with an increased amount of starch, as compared to Examples 24 and 25, to increase the reducing effect. Three levels of ferrous iron content in the smelted glasses were chosen as indicated. The batch preparation was as previously described with the formation of a solidified intermediate. The smelting at 1250°C was rapid with no excess ferrophosphorus. The roll flakes produced from the glasses were all pale and well reduced with respect to the iron content. Ammonium acetate extraction tests on Examples 26 and 27 were as follows: The glass of Example 26 had a 1.8 percent ferrous iron extraction at a pH of 5.7 and an 8.1 percent ferrous iron extraction at a pH of 8.0. The glass of Example 27 had a 1.9 percent ferrous iron extraction at a pH of 5.7 and a 6.6 percent ferrous iron extraction at a pH of 8.0.

EXAMPLES 29 AND 30

Magnetite obtained from Tennessee was used in these examples along with a reduced amount of a combined reductant comprising starch and ferrophosphorus. The batches for these two examples are give in Table E.

TABLE E

| Example | Parts by Weight | |
|---|---|---|
| | 29 | 30 |
| Tennessee Magnetite | 67.4 | 75.2 |
| KCl | 10.0 | 10.0 |
| 85% $H_3PO_4$ | 174.0 | 162.2 |
| Starch | 10.0 | 10.0 |
| Ferrophosphorus | 10.0 | 10.0 |
| Ferrous Fe Content of Glass (wt. %) | 25 | 27.5 |

Glass preparation followed the usual course, except that extra time up to 25 to 30 minutes was given to enable some floating materials to dissolve at 1250°C. Both glasses formed from the resulting melts were clear and well-reduced. The ammonium acetate extraction data were: The glass of Example 29 had a 1.3 percent ferrous iron extraction at a pH of 5.7 and a 6.0 percent ferrous iron extraction at a pH of 8.0; the glass of Example 30 had a 1.2 percent ferrous iron extraction at a pH of 5.7; and a 1.1 percent ferrous iron extraction at pH 8.0.

EXAMPLES 31 THROUGH 34

These examples illustrate the use of other halogens in place of chlorine. As previously indicated, the use of HCl in combination with phosphoric acid accelerates the reaction with the reactive iron compound to a marked degree. Similar reductions in time requirements are obtained with the use of other halogens such as with HF, HBr, and HI which are preferably added to the reaction mixture as metal halides like KF, KBr and KI.

The following Table F illustrates four batch compositions, each using a different halide as the potassium halide. The Canadian Taconite and the ferrophosphorus were ground to a minus 150 U.S. Standard sieve.

TABLE F

| Example | Parts by Weight | | | |
|---|---|---|---|---|
| | 31 | 32 | 33 | 34 |
| Batch | KF | KCl | KBr | KI |
| Canadian Taconie Concentrate | 71.6 | 71.6 | 71.6 | 71.6 |
| K Halide | 7.8 | 10.0 | 16.0 | 22.3 |
| 85% $H_3PO_4$ | 168.0 | 168.0 | 168.0 | 168.0 |
| Starch | 10.0 | 10.0 | 10.0 | 10.0 |
| Ferrophosphorus | 10.0 | 10.0 | 10.0 | 10.0 |

Preparation was the same for all of the examples. The potassium halide and Taconite concentrate were mixed and added to the phosphoric acid. In about 1 minute, the mixture became hot and in about two additional minutes the mixture became pasty. After 4 minutes from the start of the reaction, a mixture of the starch and ferrophosphorus was added to the paste of each example with mixing.

Each admixture was then smelted in a crucible at 1250°C for about 25 minutes and then the melt roll-quenched. The glass made with KI was pale in color; that made with KCl was somewhat dark, that made with KF was still darker, while that made with KBr was intermediate in color between the glasses made with KCl and KI, respectively. All of the halogens were therefore useful in carrying out the present process. Chlorine is preferred because of lower cost and ready availability.

While the glasses produced in accordance with the present process are essentially binary and preferable ternary systems, as indicated, it is understood that still other ingredients may be present. Normally, impurities are present in trace amounts, but up to 5 percent by weight of impurities may be tolerated in most cases. Impurities are usually other oxides, such as one or more of $SiO_2$, $CaO$, $TiO_2$, $B_2O_3$, $Al_2O_3$, $CoO$, $CuO$, $Fe_2O_3$, $MgO$, $MnO_2$, but other types of impurities may also be present.

Although the foregoing describes several embodiments of the present invention, it is understood that the invention may be practiced in still other forms within the scope of the following claims.

I claim:

1. A process for forming a ferrous iron-containing phosphorous glass comprising:
   a. reacting a reactive iron compound with a mixture of phosphoric and halogenic acids containing phosphoric acid in greater amount to form a solidified intermediate,
   b. heating said intermediate at a smelting temperature within the range of about 900°C to about 1500°C in the presence of a reducing agent for a time to produce a glass melt containing ferrous iron oxide, and
   c. cooling said melt to produce said glass, said iron compound, phosphoric and halogenic acids, and reducing agent being used in amounts to produce in said glass a composition consisting essentially in weight percent of about:

| | Percent |
|---|---|
| $P_2O_5$ | 50 to 75 |
| FeO | 20 to 45 |
| $R_2O$ | 0 to 10 | in which R is K or Na, and $R_2O$ contains no more than about 50% by weight of $Na_2O$.

2. The process of claim 1 in which said reactive iron compound is salt of an organic or inorganic acid that is weaker or more volatile than phosphoric acid.

3. The process of claim 1 in which said reactive iron compound is selected from the group consisting of iron oxide, hydrated iron oxide, iron carbonate, iron sulfate, iron sulfite, iron sulfide, iron nitrate, iron acetate, iron citrate, iron fumarate, and iron benzoate.

4. The process of claim 1 in which said reactive iron compound is magnetite.

5. The process of claim 1 in which said halogenic acid is hydrochloric acid.

6. The process of claim 1 in which said mixture of acids is formed from a salt of a halogenic acid and phosphoric acid.

7. The process of claim 6 in which said salt of a halogenic acid is the potassium or sodium salt of said acid.

8. The process of claim 1 in which said reducing agent is a solid carbonaceous material.

9. The process of claim 1 in which said reducing agent is a solid, iron-containing material.

10. The process of claim 1 in which the halogen of said halogenic acid is selected from the group consisting of chlorine, bromine, and iodine, and including fritting said glass to form a nutrient glass adapted for incorporation into soil.

11. The process of claim 1 in which said solidified intermediate is formed in less than 10 minutes at room temperatures.

12. A process for forming a soil nutritious, ferrous iron-containing phosphorous glass comprising:
  a. reacting a reactive iron oxide compound with a mixture of phosphoric acid and a chloride salt, said phosphoric acid being present in an amount which is greater than the amount of said chloride salt, to form a solidified intermediate,
  b. heating said intermediate at a smelting temperature within the range of about 900°C to about 1500°C in the presence of an iron-containing reducing agent for a time to produce a ferrous iron-containing glass melt, and
  c. cooling said melt to produce a ferrous iron-containing glass, said iron oxide compound, phosphoric acid, chloride salt, and iron-containing reducing agent being used in amounts to provide in said glass a composition consisting essentially in weight percent of about:

|  | Percent |
|---|---|
| $P_2O_5$ | 50 to 75 |
| FeO | 20 to 45 |
| $R_2O$ | 0 to 10 | in which R is K or Na, and $R_2O$ contains no more than about 50 percent by weight of $Na_2O$.

13. The process of claim 12 in which said chloride salt is potassium chloride.

14. The process of claim 12 in which said reducing agent includes ferrophosphorus.

15. The process of claim 12 in which said reducing agent includes ferrophosphorus and starch.

16. The process of claim 1 in which said halogenic acid is selected from the group consisting of HCl, HBr, and HI.

* * * * *